(12) United States Patent
Shen et al.

(10) Patent No.: US 8,447,121 B2
(45) Date of Patent: May 21, 2013

(54) EFFICIENT INTEGRATED DIGITAL VIDEO TRANSCODING

(75) Inventors: Guobin Shen, Beijing (CN); Shipeng Li, Beijing (CN); Wanyong Cao, Beijing (CN); Yuwen He, Beijing (CN)

(73) Assignee: Microsoft Corporation, Redmond, WA (US)

(*) Notice: Subject to any disclaimer, the term of this patent is extended or adjusted under 35 U.S.C. 154(b) by 2192 days.

(21) Appl. No.: 11/226,590

(22) Filed: Sep. 14, 2005

(65) Prior Publication Data

US 2007/0058718 A1  Mar. 15, 2007

(51) Int. Cl.
| G06K 9/36 | (2006.01) |
| G06K 9/46 | (2006.01) |
| H04B 1/66 | (2006.01) |
| H04N 7/12 | (2006.01) |
| H04N 11/02 | (2006.01) |
| H04N 11/04 | (2006.01) |

(52) U.S. Cl.
USPC ............... 382/232; 348/441; 375/240.01

(58) Field of Classification Search
USPC .... 382/232, 233, 235; 375/240–241; 348/441
See application file for complete search history.

(56) References Cited

U.S. PATENT DOCUMENTS

| 6,392,706 B1 | 5/2002 | Sugiyama |
| 6,393,059 B1 | 5/2002 | Sugiyama |
| 6,452,973 B1 | 9/2002 | Hwang |
| 6,618,442 B1 | 9/2003 | Chen et al. |
| 6,647,061 B1 * | 11/2003 | Panusopone et al. .... 375/240.12 |
| 6,671,322 B2 | 12/2003 | Vetro et al. |
| 7,388,913 B1 | 6/2008 | Christopoulos et al. |
| 2002/0126752 A1 | 9/2002 | Kim |
| 2003/0043908 A1 | 3/2003 | Gao |
| 2003/0058940 A1 | 3/2003 | Klein Gunnewiek et al. |
| 2005/0132264 A1 * | 6/2005 | Joshi et al. ................. 715/500.1 |
| 2005/0147163 A1 * | 7/2005 | Li et al. ..................... 375/240.12 |
| 2005/0169377 A1 | 8/2005 | Lin et al. |
| 2005/0175099 A1 * | 8/2005 | Sarkijarvi et al. ....... 375/240.16 |
| 2005/0213664 A1 * | 9/2005 | Mahkonen et al. ...... 375/240.17 |
| 2006/0140274 A1 * | 6/2006 | Lu et al. ................... 375/240.16 |

FOREIGN PATENT DOCUMENTS

| AU | 2005201439 A1 | 10/2005 |
| CN | 1407808 A | 4/2003 |

(Continued)

OTHER PUBLICATIONS

PCT International Search Report and Written Opinion and dated Feb. 7, 2007, from counterpart PCT patent application serial No. PCT/US2006/035640, 10 pages.

(Continued)

*Primary Examiner* — Aaron W Carter
(74) *Attorney, Agent, or Firm* — Lee & Hayes, PLLC

(57) ABSTRACT

Efficient integrated digital video transcoding is described. In one aspect, an integrated transcoder receives an encoded bitstream. The integrated transcoder transcodes the encoded bitstream by partially decoding the encoded bitstream based on a first transform associated with a first media data format. The decoding operations generate an intermediate data stream. The integrated transcoder then encodes the intermediate data stream using a second transform associated with a second media data format. The first and second transforms are not the same.

19 Claims, 13 Drawing Sheets

FOREIGN PATENT DOCUMENTS

| | | |
|---|---|---|
| CN | 1435056 A | 8/2003 |
| JP | 11073410 A | 3/1999 |
| JP | 2001145113 A | 5/2001 |
| JP | 2003189309 A | 7/2003 |
| JP | 2004015744 A | 1/2004 |
| JP | 2004504739 A | 2/2004 |
| WO | WO2004093461 | 10/2004 |

OTHER PUBLICATIONS

Chinese Office Action for Application No. 200680033558.3 filed Sep. 13, 2006, based on U.S. Appl. No. 11/226,590. 8 pages.

Japanese Office Action mailed Oct. 7, 2011 for Japanese patent application No. 2008-531271, a counterpart foreign application of U.S. Appl. No. 11/226,590, 7 pages.

\* cited by examiner

EFFICIENT INTEGRATED DIGITAL VIDEO TRANSCODING

BACKGROUND

Digital video content is typically generated to target a specific data format. A video data format generally conforms to a specific video coding standard or a proprietary coding algorithm, with a specific bit rate, spatial resolution, frame rate, etc. Such coding standards include MPEG-2 and WINDOWS Media Video (WMV). Most existing digital video contents are coded according to the MPEG-2 data format. WMV is widely accepted as a qualified codec in the streaming realm, being widely deployed throughout the Internet, adopted by the HD-DVD consortium, and currently being considered as a SMPTE standard. Different video coding standards provide varying compression capabilities and visual quality.

Transcoding refers to the general process of converting one compressed bitstream into another compressed one. To match a device's capabilities and distribution networks, it is often desirable to convert a bitstream in one coding format to another coding format such as from MPEG-2 to WMV, to H.264, or even to a scalable format. Transcoding may also be utilized to achieve some specific functionality such as VCR-like functionality, logo insertion, or enhanced error resilience capability of the bitstream for transmission over wireless channels.

FIG. 1 shows a conventional Cascaded Pixel-Domain Transcoder (CPDT) system, which cascades a front-end decoder to decode an input bitstream with an encoder that generates a new bitstream with a different coding parameter set or in new format. One shortcoming of this conventional transcoding architecture is that its complexity typically presents an obstacle for practical deployment. As a result, the CPDT transcoding architecture of FIG. 1 is typically used as a performance benchmark for improved schemes.

FIG. 2 shows a conventional cascaded DCT-domain transcoder (CDDT) architecture, simplifying the CPDT architecture of FIG. 1. The system of FIG. 2 limits functionality to spatial/temporal resolution downscaling and coding parameter changes. CDDT eliminates the DCT/IDCT processes implemented by the CPDT transcoder of FIG. 1. Yet, CDDT performs MC in the DCT domain, which is typically a time-consuming and computationally expensive operation. This is because the DCT blocks are often overlapped with MC blocks. As a result, the CDDT architecture typically needs to apply complex and computationally expensive floating-point matrix operations in order to perform MC in the DCT domain. Additionally, motion vector (MV) refinement is typically infeasible utilizing the CDDT architecture.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, efficient integrated digital video transcoding is described. In one aspect, an integrated transcoder receives an encoded bitstream. The integrated transcoder transcodes the encoded bitstream by partially decoding the encoded bitstream based on a first set of compression techniques associated with a first media data format. The decoding operations generate an intermediate data stream. The integrated transcoder then encodes the intermediate data stream using a second set of compression techniques associated with a second media data format. The first and second sets of compression techniques are not the same.

BRIEF DESCRIPTION OF THE DRAWINGS

In the Figures, the left-most digit of a component reference number identifies the particular Figure in which the component first appears.

For purposes of discussion and illustration, color is used in the figures to present the following conventions. A blue solid arrow represents pixel domain signal with respect to real or residual picture data. A red solid arrow represents signal in the DCT domain. An orange dashed arrow represents motion information.

DETAILED DESCRIPTION

Overview

Systems and methods for efficient digital video transcoding are described below in reference to FIGS. 4 through 14. These systems and methods utilize information in the input bitstream to allow an application to dynamically control error propagation, and thereby, selectively control speed and quality of video bitstream transcoding. This selective control allows an application to seamlessly scale from close-loop transcoding (high-speed transcoding profile) to open-loop (high-quality transcoding profile) transcoding schemes. In contrast to conventional transcoding architectures (e.g., the CPDT of FIG. 1 and the CDDT of FIG. 2), the architectures for efficient digital video transcoding are integrated and that they combined different types of Discrete Cosine Transforms (DCTs) or DCT-like transforms into one transcoding module. The systems and methods for efficient video transcoding implement requantization with a fast lookup table, and provide fine drifting control mechanisms using a triple threshold algorithm.

In one implementation, where efficient digital video transcoding transcodes a bitstream data format (e.g., MPEG-2, etc.) to WMV, the high-quality profile transcoding operations support advanced coding features of WMV. In one implementation, high-speed profile transcoding operations implement arbitrary resolution two-stage downscaling (e.g., when transcoding from high definition (HD) to standard definition (SD)). In such two-stage downscaling operations, part of the downscaling ratio is efficiently achieved in the DCT domain, while downscaling ratio operations are implemented in the spatial domain at a substantially reduced resolution.

Exemplary Conceptual Basis

Figure 3:
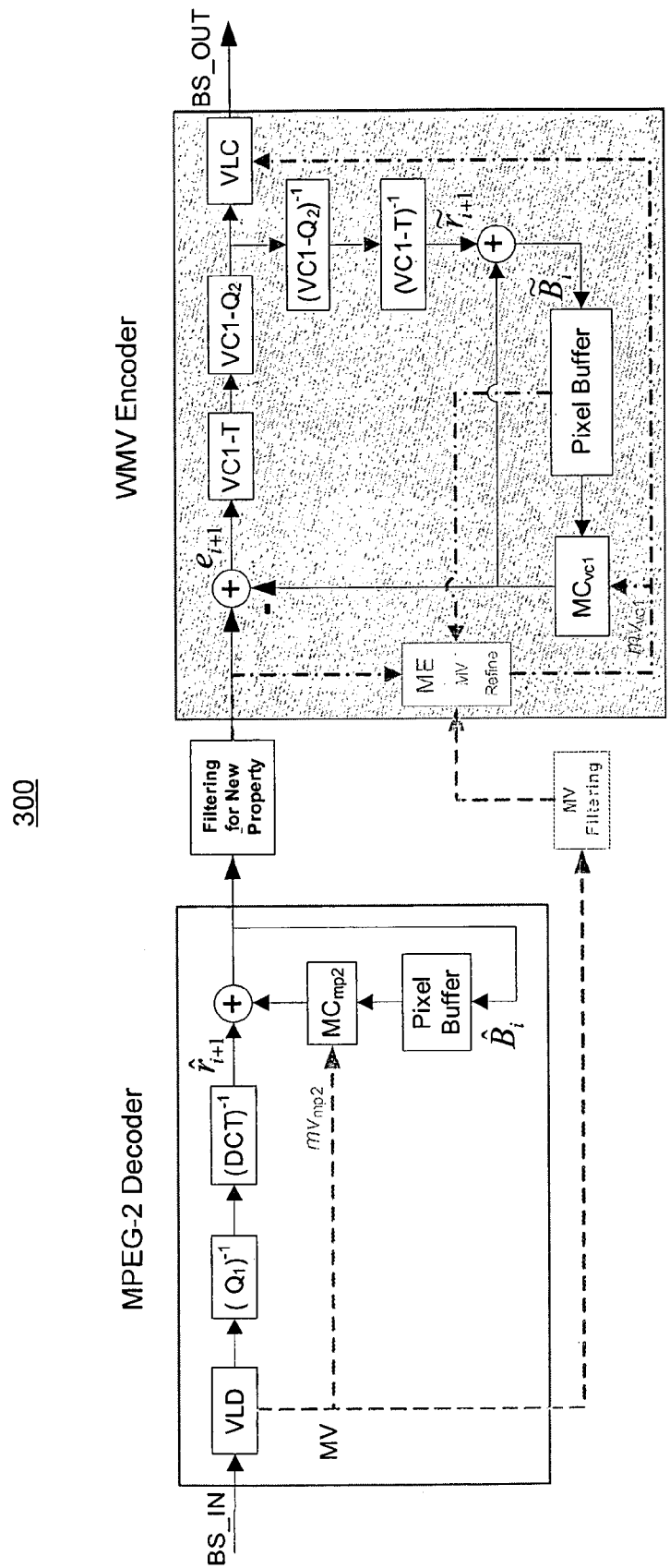
FIG. 3 shows an exemplary non-integrated pixel-domain transcoding split-architecture to transcode MPEG-2 to WMV, according to one embodiment. More particularly, this split-architecture provides a conceptual basis for efficient integrated digital video transcoding.

FIG. 3 shows exemplary non-integrated cascaded pixel-domain transcoding split-architecture 300 to convert MPEG-2 to WMV. This split-architecture is not integrated because separate modules respectively perform decoding and encoding operations. The split-architecture of FIG. 3 provides a conceptual basis for subsequent description of the integrated systems and methods for efficient digital video transcoding. TABLE 1 shows symbols and their respective meanings for discussion of FIG. 3.

TABLE 1

| | |
|---|---|
| $e_{i+1}$ | Error of frame (i + 1) to be encoded by encoding portion of the transcoder; |
| $\hat{B}_i$ | Reconstructed frame i by MPEG-2 decoder at original resolution; |
| $\tilde{B}_i$ | Reconstructed frame i by the encoder at original resolution; |
| $\hat{b}_i$ | Reconstructed frame i by the MPEG-2 decoder at reduced resolution; |
| $\tilde{b}_i$ | Reconstructed frame i by the encoder at reduced resolution; |
| $\hat{r}_{i+1}$ | Reconstructed residues of frame (i + 1) by MPEG-2 decoder; |
| $\tilde{r}_{i+1}$ | Reconstructed residues of frame (i + 1) by the encoder |
| $MC_{mp2}(B, mv)$ | Motion compensated prediction with reference picture B and motion vector mv by MPEG-2 decoder, on 16 × 16 block basis; |
| $MC_{vc1}(B, mv)$ | Motion compensated prediction with reference picture B and motion vector mv by transcoder 308 (encoder), either on 16 × 16 or 8 × 8 block basis; |
| $MC'_{mp2}(b, mv)$ | Motion compensated prediction with reduced resolution reference b and motion vector mv, using MPEG-2 filtering, on 8 × 8 or smaller block basis |
| $MC'_{vc1}(b, mv)$ | Motion compensated prediction with reduced resolution reference B and motion vector mv, using transcoder 308 filtering, on 8 × 8 or smaller block basis; |
| MV | Motion vector in the original frame resolution |
| mv | Motion vector in the reduced frame resolution |

For purposes of description and exemplary illustration, system 300 is described with respect to transcoding from MPEG-2 to WMV with bit rate reduction, spatial resolution reduction, and their combination. Many existing digital video contents are coded according to the MPEG-2 data format. WMV is widely accepted as a qualified codec in the streaming realm, being widely deployed throughout the Internet, adopted by the HD-DVD Consortium, and currently being considered as a SMPTE standard.

MPEG-2 and WMV provide varying compression and visual quality capabilities. For example, the compression techniques respectively used by MPEG-2 and WMV are very different. For instance, the motion vector (MV) precision and motion compensation (MC) filtering techniques are different. In MPEG-2 motion precision is only up to half-pixel accuracy and the interpolation method is bilinear filtering. In contrast, in WMV, the motion precision can go up to quarter-pixel accuracy, and two interpolation methods namely bilinear filtering and bicubic filtering are supported. Moreover, there is a rounding control parameter involved in the filtering process. Use of WMV may result in up to a 50% reduction in video bit rate with negligible visual quality loss, as compared to an MPEG-2 bit rate.

In another example, transforms used by MPEG-2 and WMV are different. For instance, MPEG-2 uses standard DCT/IDCT and the transform size is fixed to 8×8. In contrast, WMV uses integer transforms (VC1-T) where the elements of transform kernel matrix are all small integers. Additionally, transform size can be altered using WMV from blocks to blocks using either 8×8, 8×4, 4×8 and 4×4. MPEG-2 does not support frame level optimization. Whereas, WMV supports various frame level syntaxes for performance optimization. WMV supports many other advanced coding features such as intensity compensation, range reduction, and dynamic resolution change, etc.

In view of the above, to provide bit rate reduction without resolution change, the filtering process bridging the MPEG-2 decoder and the WMV encoder shown in FIG. 3 is an all-pass filter (i.e., not in effect). Therefore, the input to the encoder for frame (i+1) is expressed as:

$$e_{i+1} = \hat{r}_{i+1} + MC_{mp2}(\hat{B}_i, MV_{mp2}) - MC_{vc1}(\tilde{B}_i, MV_{vc1}) \qquad (1)$$

In this implementation, WMV coding efficiency of FIG. 3 gains result from finer motion precision. In WMV, quarter-pixel motion precision is allowed beside the common half-pixel precision as in MPEG-2. Moreover, WMV allows better but more complex interpolation known as bicubic interpolation for MC filtering. Bilinear interpolation is used for MPEG-2 in the MC module ($MC_{mp2}$) for half-pixel MC. The bilinear interpolation method similar to that used in WMV with the exception that the MPEG-2 bilinear interpolation does not have rounding control. To achieve high speed, half-pixel motion accuracy can be implemented in the encoder portion. One reason for this is the lack of the absolute original frame (i.e., bitstream input data (BS_IN) is already compressed). Thus, in this example, it is difficult to obtain a more accurate yet meaningful motion vector. On the other hand, the motion information obtained from MPEG-2 decoder (i.e. $MV_{vc1} = MV_{mp2}$) can be reused directly. Since there is no resolution change, there is no MV precision loss with this assumption. If the encoder is further restricted to use bilinear interpolation and force the rounding control parameter to be always off, then under the reasonable assumption that motion compensation is a linear operation and ignoring the rounding error (i.e., $MC_{VC9} = MC_{mp2}$), Equation 1 is simplified as follows:

$$e_{i+1} = \hat{r}_{i+1} + MC_{mp2}(\hat{B}_i - \tilde{B}_i, MV_{mp2}) \qquad (2)$$

According to Equation 2, the reference CPDT transcoder in FIG. 3 can be simplified. Such a simplified architecture is described below in reference to FIG. 5. Prior to describing the simplified architecture, an exemplary system for efficient digital video transcoding is first described.

An Exemplary System

Although not required, efficient digital video transcoding is described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 4:
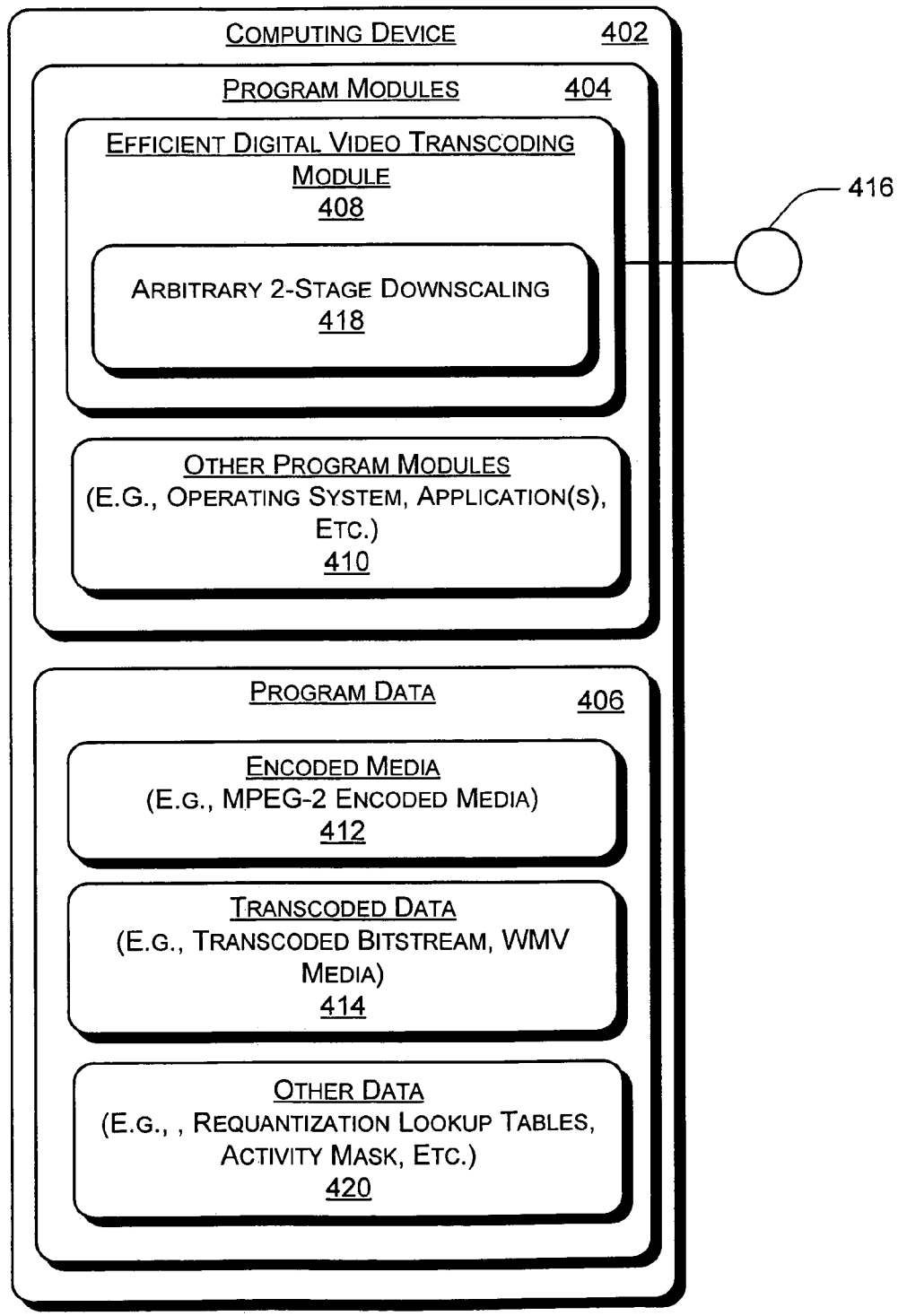
FIG. 4 shows an exemplary system for efficient integrated digital video transcoding, according to one embodiment.

FIG. 4 shows an exemplary system 400 for efficient digital video transcoding. In this implementation, the operations of system 400 are described with respect to hybrid DCT and block-based motion compensation (MC) video coding schemes, upon which many video coding standards and proprietary formats are based. More particularly, system 400 is described with architectures, components, and operations used to transcode MPEG-2 to WMV. However, it can be appreciated that the architectures, components, and operations described for scalable complexity and efficiency transcoding embodied by system 400 for transcoding MPEG-2 to WMV can also be applied to other bitstream data format conversions besides MPEG-2 and WMV. For example, in one implementation, system 400 is utilized to transcode MPEG-2 bitstream to MPEG-4 bitstream and MPEG-4 bitstream data to WMV bitstream data, etc. In such alternate embodiments, the following described transcoding architectures of system 400 (including components and operations associated therewith), consider the type of bitstream data being decoded, encoded, and respective data formats.

In this implementation, system 400 includes a general-purpose computing device 402. Computing device 402 represents any type of computing device such as a personal computer, a laptop, a server, handheld or mobile computing device, etc. Computing device 402 includes program modules 404 and program data 406 to transcode an encoded bitstream in a first data format (e.g. MPEG-2) to a bitstream encoded into a different data formats (e.g., WMV). Program modules 404 include, for example, efficient digital video transcoding module 408 ("transcoding module 408") and other program modules 410. Transcoding module 408 transcodes encoded media 412 (e.g., MPEG-2 media) into transcoded media 414 (e.g., WMV media). Other program modules 410 include, for example, an operating system and an application utilizing the video bitstream transcoding capabilities of transcoding module 408, etc. In one implementation, the application is part of the operating system. In one implementation, transcoding module 408 exposes its transcoding capabilities to the application via an Application Programming Interface (API) 416.

High-Speed Profile Transcoding

Figure 5:
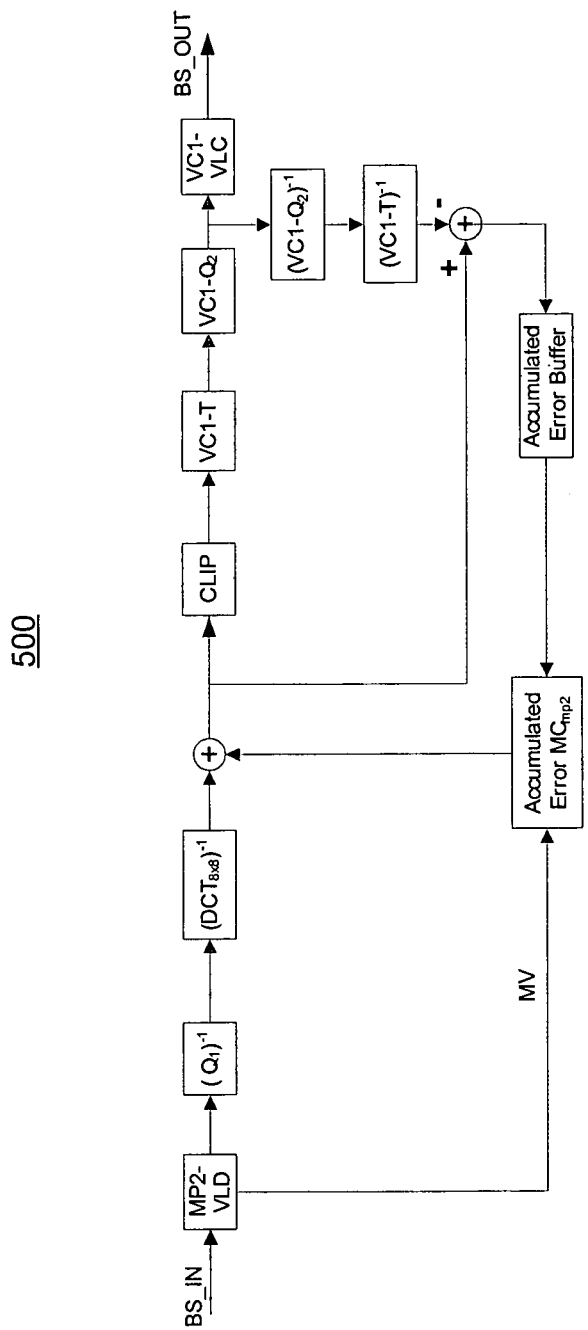
FIG. 5 shows an exemplary simplified close-loop cascaded pixel-domain transcoder, according to one embodiment.

FIG. 5 shows an exemplary simplified integrated closed-loop cascaded pixel-domain transcoder without error propagation. For purposes of discussion and illustration, the components of FIG. 5 are described in reference to the components of FIG. 4. For instance, the architecture of FIG. 5 is representative of one exemplary architecture implementation of transcoding module 408 of FIG. 4. Referring to the architecture 500 FIG. 5, as compared to the architecture in FIG. 3, please note that this is an integrated architecture without separate encoder and decoder components. Additionally, please note that the MV refining motion estimation module is removed from the MC in MPEG-2 decoder. Additionally, MC in the WMV encoder is merged to a MC that operates on accumulated requantization errors. In this manner, the transcoding architecture of FIG. 5 significantly reduces computation complexity for high-speed transcoding of progressive and interlaced video data formats.

Please note that the WMV transform is different from the one used in MPEG-2. In MPEG-2, standard floating point DCT/IDCT is used whereas the integer transform, whose energy packing property is akin to DCT, is adopted in WMV. As a result, the IDCT in the MPEG-2 decoder and the VC1-T in WMV encoder do not cancel out each other. The integer transform in WMV is different from the integer implementation of DCT/IDCT. The integer transform in WMV is carefully designed with all the transform coefficients to be small integers. Conventional transcoders are not integrated to transcode a bitstream encoded with respect to a first transform to a second transform that is not the same as the first transform.

Equation 3 provides an exemplary transform matrix for 8×8 VC1-T.

$$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -12 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix} \quad (3)$$

Equation 3 in combination with equations 4 and 5, which are described below, indicate how two different transforms are implemented into a scaling component of transcoding module 408 (FIG. 4). In one implementation, the accuracy of VC1-T is 16-bit accuracy, which is very suitable for MMX implementation. As a result, the codec complexity can be significantly reduced.

Figure 6:
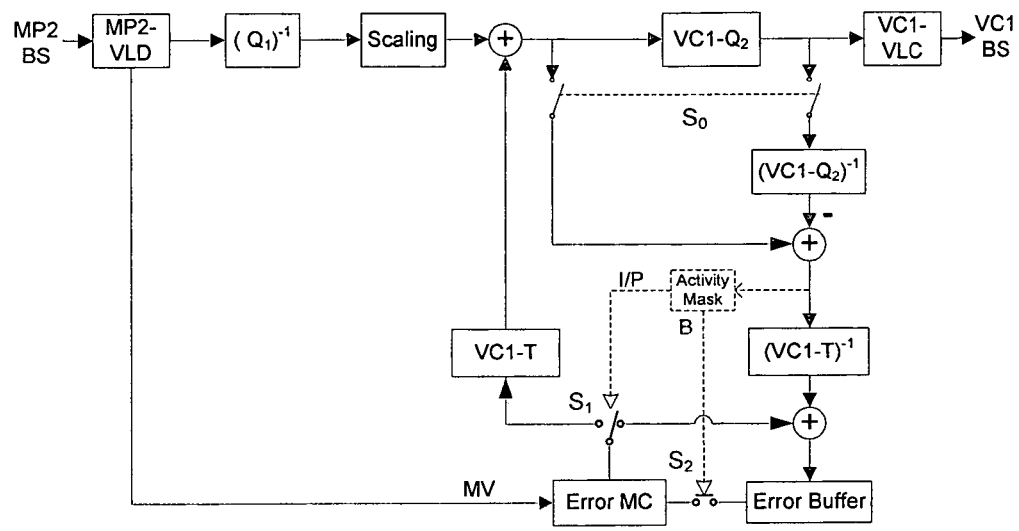
FIG. 6 shows an exemplary simplified closed-loop DCT-domain transcoder, according to one embodiment.

FIG. 6 shows an exemplary simplified closed-loop DCT-domain transcoder. The architecture of FIG. 6 is representative of one exemplary architecture implementation of transcoding module 408 (FIG. 4). The architecture 600 of FIG. 6 is a simplified architecture as compared to the architecture 500 of FIG. 5. Referring to FIG. 6, let $C_8$ be the standard DCT transform matrix, B, the inverse quantized MPEG-2 DCT block, and b, the IDCT of B, then the MPEG-2 IDCT is calculated as follows:

$$b = C_8'BC_8$$

Let $\hat{B}$ be the VC1-T of b, then $\hat{B}$ is calculated as:

$$\hat{B} = T_8 b T_8' o N_{88}$$

where o denotes element-wise multiplication of two matrices, and $N_{88}$ is the normalization matrix for VC1-T transform which is calculated as follows:

$$N_{88} = c_8 \cdot c_8'$$

with
$c_8 = [8/288\ 8/289\ 8/292\ 8/298\ 8/288\ 8/289\ 8/292\ 8/298]$;
$\hat{B}$ is directly computed from B, using the following formula:

$$\hat{B} = T_8(C_8'BC_8)T_8' o N_{88} \quad (4)$$

To verify that $T_8 C_8'$ and $C_8 T_8'$ are very close to diagonal matrices, if we apply the approximation, then Equation 4 becomes an element-wise scaling of matrix B. That is, $$\hat{B} = B o S_{88} \quad (5)$$

where $$S_{88} = \text{diag}(T_8 C_8') \cdot \text{diag}(C_8 T_8') o N_{88}$$

Equation 5 shows that the VC1-T in WMV encoder and the IDCT in MPEG-2 decoder can be merged. Consequently, the architecture in FIG. 5 can be further simplified to the one shown in FIG. 6. Detailed comparison reveals that the two DCT/IDCT modules are replaced by two VC1-T and inverse VC1-T modules. In one implementation, a simple scaling module is also added. Two switches are embedded along with and an activity mask in this architecture. These embedded components, as described below, are used for dynamic control of the complexity of transcoding coating operations of transcoder 408 (FIG. 4). At this point, these components are connected. The 16-bit arithmetic property of the WMV transform lends itself to parallel processing for PC and DSP. In view of this, computation complexities are significantly reduced. Moreover, since all the elements of the scaling matrix, $S_{88}$, are substantially close in proximity with respect to one another, this computation, and one implementation, is replaced by a scalar multiplication.

FIGS. 5 and 6 show exemplary respective closed-loop transcoding architectures, wherein a feedback loop is involved. In this implementation, the feedback loop, which includes VC-1 dequantization, VC-1 inverse transform, residue error accumulation and MC on the accumulated error, compensates for the error caused by the VC-1 requantization process. Requantization error is a main cause of the drifting error for bit-rate-reduction transcoders, such as that shown in FIG. 1. Although the transcoding architectures of FIGS. 5 and 6 are not completely drift-free, even with error compensation, the drifting error is very small. This is because the remaining cause of drift error is the rounding error during motion compensation filtering. One merit of residue error compensation is that the architectures of FIGS. 5 and 6 provide for dynamically turning on or off the compensation process, as described below with respect to TABLE 2. The transcoding architecture of FIG. 6 performs pure bit rate reduction transcoding from MPEG-2 to WMV such as SD to SD or HD to HD conversion in a substantially optimal manner.

More particularly, conventional cascaded transcoder architectures (e.g., the architectures of FIGS. 1 and 2) lack complexity flexibility. With respect to computation savings, the most that such conventional architecture can achieve is through MV reuse and mode mapping. On the other hand, accumulated residue error compensation architectures, for example, the architecture of FIG. 6 (and the architectures of FIGS. 8 and 10, as described below) have built-in scalability in terms of complexity. TABLE 2 shows exemplary meanings of switches in FIG. 6.

TABLE 2

Exemplary Switches for Dynamic Control of Transcoding Speed and Quality

| | | |
|---|---|---|
| $S_0$ | Block level | Error accumulation switch |
| $S_1$ | Block level | Error update switch |
| $S_2$ | Block level | Early skip block decision switch |

After transcoding module 408 of FIG. 4 has implemented drift-free simplification, an application can dynamically trade-off between the complexity and the quality to accelerate transcoding speed. In this implementation, quality can be traded for speed, and vice versa. In other words, some drifting error may be allowed in the further simplified transcoder. With this strategy, the drifting error introduced in the faster method is limited and fully controllable. Based on this consideration, three switches ($S_0$, $S_1$, and $S_2$) are provided in the architectures of FIGS. 6, 8, and 10. The switches are used only to the residue-error compensation based architectures. The switches selectively skip some time-consuming operations to reduce complexity substantially, while introducing only a small amount of error. The meanings of various switches are summarized in TABLE 2. Computational decisions associated with these switches are efficiently obtained according to criteria described below with respect to each switch.

Switch $S_0$ controls when requantization error of a block should be accumulated into the residue-error buffer. As compared to a standard reconstruction selector, the role of switch $S_0$ is improved by adopting a fast lookup table based requantization process and by providing a finer drifting control mechanism via a triple-threshold algorithm. As a result, all observations made with respect to switch $S_0$ are considered. For example, in one implementation, the DCT domain energy difference may be utilized as the indicator.

Switch $S_1$ controls when the most time-consuming module, MC of the accumulated residue error. In one implementation, switch $S_1$ is on. A binary activity mask is created for the reference frame. Each element of the activity mask corresponds to the activeness of an 8×8 block, as determined by $$\text{Activity}(Block_i) = \begin{cases} 1, & \text{Energy}(block_i) > Th \\ 0, & \text{Energy}(block_i) \leq Th \end{cases}$$

where Energy($block_i$) is the energy of the block in the accumulated residue-error buffer. In one implementation, Energy ($block_i$) is calculated spatial domain or DCT domain. Energy ($block_i$) can be approximated by the sum of absolute values. If the MV points to blocks belonging to the area of low activity, then MC of the accumulated residue error for that specific block is skipped.

Switch $S_2$ performs early detection to determine whether block error should be encoded. This is especially useful in transrating applications where the encoder applies a coarser quantization step size. In this implementation, if the input signal (the sum of the MC of accumulated residue error and the reconstructed residue from MPEG-2 decoder) is weaker than a threshold, then switch $S_2$ is turned off so that no error will be encoded.

In one implementation, thresholds for the switches $S_0$, $S_1$, and $S_2$ are adjusted such that earlier reference frames are processed with higher quality and at slower speed. This is because the purpose of the switches is to achieve a better trade-off between quality and speed, and because of the predictive coding nature.

High-Quality Profile Transcoder

If bit rate change is not significant or the input source quality is not very high, the architecture of FIG. 6 substantially optimizes bit rate reduction when converting MPEG-2 bitstreams to WMV bitstreams. On the other hand, input source may be of high quality and high quality output may be desired, also speed of transcoding may be a moderate requirement (e.g., real-time). A high-quality profile transcoder, such as the cascaded pixel-domain transcoder (CDPT) of FIG. 3 with MV refinement, meets these criteria. With this architecture, we can turn on all the advanced coding features of the WMV encoder to ensure highest coding efficiency can be achieved.

Resolution Change

In conventional media transcoding systems there are generally three sources of errors for transcoding with spatial resolution downscaling. These errors are as follows:

Downscaling: errors generated when obtaining a downscaled video. It is typically a hardwired choice when designing operations of the downscaling filter to make a trade-off between visual quality and complexity, especially when downscaling in the spatial domain.

Requantization error: As with the pure bit rate reduction transcoding process, this is error due to the requantization with a coarser re-quantization step size.

MV Error: Incorrect MV will lead to wrong motion compensated prediction. As a result, no matter how the requantization error is compensated, and no matter how high the bit rate goes, a perfect result is difficult to obtain if not re-computing the motion compensation based on the new MVs and modes. This is a problem for conventional systems that transcode B-frames, because WMV supports only one MV mode for B-frames. This could also be a problem if one desires to perform optimization, which would lead to coding mode change, e.g., from four-MV to one-MV mode. Moreover, the problem generally exists for chrominance components since they are typically compensated with a single MV. (This is not a problem for the described efficient digital video transcoding architectures when applied to P-frames. One reason for this is because WMV supports four-MV coding mode for P-frames).

The operations of transcoding module 408 (FIG. 4) address the last two sources of errors, as now described.

Requantization Error Compensation

Let D denote the down-sampling filtering. Referring to the architecture of FIG. 3, input to the VC-1 encoder for frame (i+1) is derived as follows:

$$e_{i+1} = D(\hat{r}_{i+1}) + D(MC_{mp2}(\hat{B}_i, MV_{mp2})) - MC_{vc1}(\tilde{b}_i, mv_{vc1}) \quad (6)$$

Assume that $MC_{VC1} = MC_{mp2}$, $mv_{mp2} = mv_{vc1} = MV_{mp2}/2$. With the approximation that $$D(MC_{mp2}(\hat{B}_i, MV_{mp2})) = MC'_{mp2}(D(\hat{B}_i)),$$
$$D(MV_{mp2})) = MC'_{mp2}(\tilde{b}_i, mv_{mp2}) \quad (7),$$

Equation 6 is simplified to the following:

$$e_{i+1} = D(\hat{r}_{i+1}) + MC'_{mp2}(\hat{b}_i - \tilde{b}_i, mv_{mp2}) \quad (8)$$

The first term in Equation 8, $D(\hat{r}_{i+1})$, refers to the downscaling process of the decoded MPEG-2 residue signal. This first term can be determined using spatial domain low-pass filtering and decimation. However, use of DCT-domain downscaling to obtain this term results in a reduction of complexity and better PSNR and visual quality. DCT-domain downscaling results are substantially better than results obtained through spatial domain bi-linear filtering or spatial domain 7-tap filtering with coefficients (−1, 0, 9, 16, 9, 0, −1)/32. In this implementation, DCT-domain downscaling retains only the top-left 4×4 low-frequency DCT coefficients. That is, applying a standard 4×4 IDCT on the DCT coefficients retained will result in a spatially 2:1 downscaled image (i.e., transcoded media 414 of FIG. 4).

The second term in Equation 8, $MC'_{mp2}(\hat{b}_i - \tilde{b}_i, mv_{mp2})$, implies requantization error compensation on a downscaled resolution. In this implementation, the MC in MPEG-2 decoder and the MC in WMV encoder are merged to a single MC process that operates on accumulated requantization errors at the reduced resolution.

Figure 7:
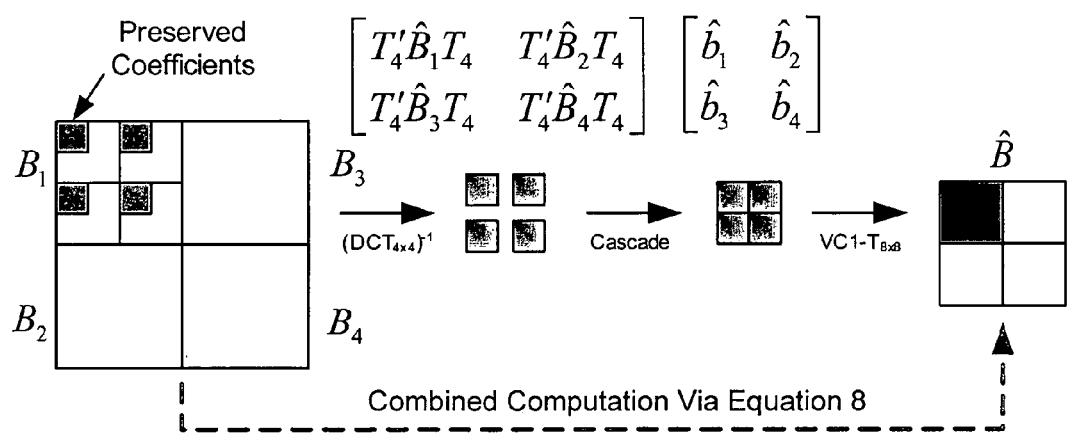
FIG. 7 shows an exemplary merge operation of four 4×4 DCT blocks into one 8×8 DCT block, according to one embodiment. This merge operation is performed during efficient video content transcoding.

FIG. 7 shows an exemplary merge operation of four (4) 4×4 DCT blocks into one 8×8 DCT block. One practical issue remains. In DCT-domain downscaling, four 8×8 DCT (blocks, $B_1$ through $B_4$ in an MPEG-2 macroblock (MB) at the original resolution) are mapped to the four 4×4 sub-blocks of an 8×8 block of the new MB at the reduced resolution and still in DCT domain (e.g., please see FIG. 7). In WMV, for P-frames and B-frames, the 4×4-transform type is allowed. As a result, nothing needs to be done further except the abovementioned scaling. However, for I-frames, only the 8×8-transform type is allowed. Thus, when dealing with I-frames, transcoding module 408 (FIG. 4) converts the four 4×4 low-frequency DCT sub-blocks into an 8×8 DCT block: $\hat{B}$. In one implementation, this is accomplished by inverse transforming the four 4×4 DCT sub-blocks back into the pixel domain, and then applying a fresh 8×8 VC1-T. In one implementation, and to reduce computation complexity, this is achieved in the DCT domain.

For example, let $\hat{B}_1$, $\hat{B}_2$, $\hat{B}_3$, and $\hat{B}_4$ represent the four 4×4 low-frequency sub-blocks of $B_1, B_2, B_3,$ and $B_4$, respectively; $C_4$ be the 4×4 standard IDCT transform matrix; $T_8$ be the integer WMV transform matrix; and further let $T_8 = [T_L, T_R]$ where $T_L$ and $T_R$ are 8×4 matrices. In this scenario, $\hat{B}$ is directly calculated from $\hat{B}_1$, $\hat{B}_2$, $\hat{B}_3$, and $\hat{B}_4$ using the following equation:

$$\hat{B} = (T_L C_4')\hat{B}_1 (T_L C_4')' + (T_L C_4')\hat{B}_2 (T_R C_4')' + (T_R C_4')\hat{B}_3 (T_L C_4')' + (T_R C_4')\hat{B}_4 (T_R C_4')'$$

After some manipulation, $\hat{B}$ is more efficiently calculated as follows:

$$\hat{B} = (X+Y)C' + (X-Y)D'$$

wherein $$C = (T_L C_4' + T_R C_4')/2$$

$$D = (T_L C_4' - T_R C_4')/2$$

$$X = C(\hat{B}_1 + \hat{B}_3) + D(\hat{B}_1 - \hat{B}_3)$$

$$Y = C(\hat{B}_2 + \hat{B}_4) + D(\hat{B}_2 - \hat{B}_4)$$

In one implementation, both C and D of the above equation are pre-computed. The final results are normalized with $N_{88}$.

Figure 8:
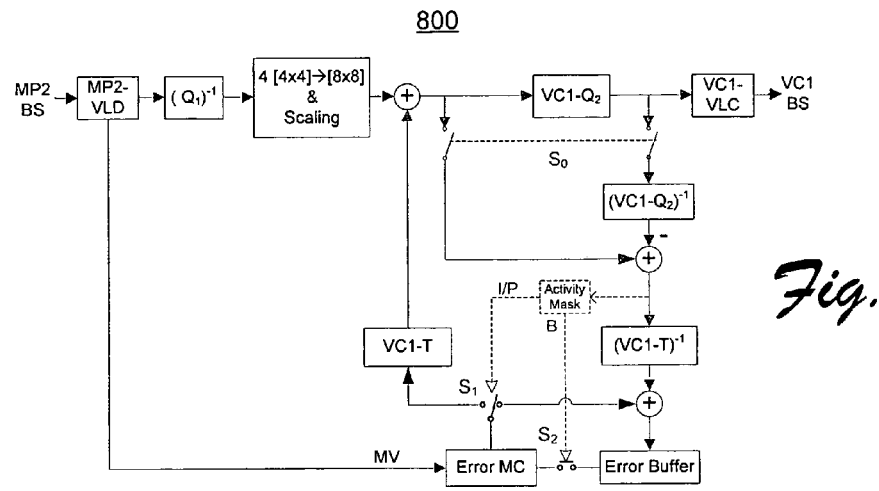
FIG. 8 shows an exemplary architecture for a simplified DCT-domain numeral 2:1 resolution downscaling transcoder, according to one embodiment.

FIG. 8 shows an exemplary architecture 800 for a simplified DCT-domain numeral 2:1 resolution downscaling transcoder. In one implementation, transcoding module 408 of FIG. 4 implements the exemplary architecture 800. The switches in this architecture have the same functionality as those in FIG. 6, as described above in reference to TABLE 2. Referring to FIG. 8, and one implementation, the first two modules (MPEG-2 VLD and inverse quantization) are simplified as compared to what is shown in FIG. 6. This is because transcoding module 408 retrieves only the top-left 4×4 portion out of the 8×8 block.

Compared to a conventional drift-low transcoder with drifting error compensation in reduced resolution, the transcoders of FIGS. 6 and 8 do not include a mixed block-processing module. This is because WMV supports Intra coding mode for 8×8 blocks in an Inter coded macroblock. In other words, an Intra MB at the original resolution is mapped into an Intra 8×8 block of an Inter MB at the reduced resolution. In view of this, the MB mode mapping rule becomes very simple, as shown immediately below:

$$\text{mode\_new} = \begin{cases} INTRA & \text{if all mode\_orig} = INTRA \\ SKIP & \text{if all mode\_orig} = SKIP \\ INTER & \text{otherwise} \end{cases}$$

Existing mixed block processing operations typically require a decoding loop to reconstruct a full resolution picture. Therefore, the removal of mixed block processing provides substantial computation savings as compared to conventional systems.

Simplified DCT-domain 2:1 resolution downscaling transcoding architecture 800 is substantially drifting-free for P-frames. This is a result of the four-MV coding mode. The only cause of drifting error, as compared with a CPDT architecture with downscaling filtering, is the rounding of MVs from quarter resolution to half resolution (which ensures $mv_{mp2}=mv_{vc1}$) and the non-commutative property of MC and downscaling. Any such remaining errors are negligible due to the low-pass downscaling filtering (e.g., achieved in the DCT domain or in the pixel domain).

Figure 9:
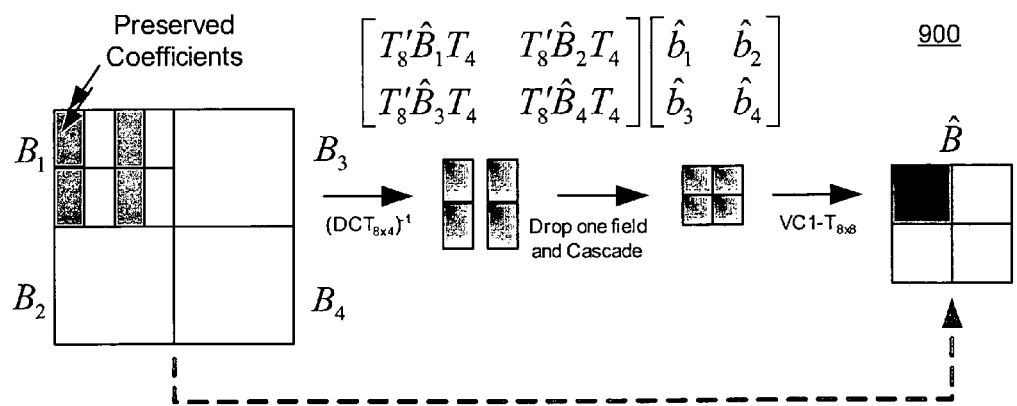
FIG. 9 shows an exemplary merge operation of four 4×4 DCT blocks into one 8×8 DCT block for interlace media for 2:1 spatial resolution downscaling transcoding operations, according to one embodiment.

FIG. 9 shows an exemplary merge operation of four 4×4 DCT blocks into one 8×8 DCT block for interlace media for 2:1 spatial resolution downscaling transcoding operations, according to one embodiment. 2:1 downscaling changes resolution of an original frame by two in both horizontal and vertical directions. In one implementation, this interlace process is implemented by transcoding module 408 of FIG. 4. More particularly, for interlace coded content, the top-left 8×4 sub-block in every MB is reconstructed by shortcut MPEG-2 decoder, both fields are smoothed by low pass filter in vertical direction, then one field is dropped before the WMV encoding process.

MV Error Compensation

Although WMV supports four MV coding mode, it is typically only intended for coding P-frames. As a result, system 400 (FIG. 4) implements the architecture of FIG. 6 when there are no B-frames in the input MPEG-2 stream or the B-frames are to be discarded during the transcoder towards a lower temporal resolution. One reason for this is that WMV allows only one MV per MB for B-frames. In such a scenario, transcoding module 408 (FIG. 4) composes a new motion vector from the four MVs associated with the MBs at the original resolution. Each of the previously mentioned MV composition methods is compatible. In one implementation, transcoding module 408 implements median filtering. As described, incorrect MV will lead to wrong motion compensated prediction. To make matters worse, no matter how the requantization error is compensated, and no matter how high the bit rate goes, perfect results are difficult to obtain if not re-doing the motion compensation based on the new MVs. Therefore, we provide an architecture that allows such motion errors to be compensated.

Again, referring to the architecture of FIG. 3, input to the VC-1 encoder for frame (i+1), which is assumed to be a B-frame, is derived as follows:

$$e_{i+1} = D(\hat{r}_{i+1}) + D(MC_{mp2}(\hat{B}_i, MV_{mp2})) - MC_{vc1}(\tilde{b}_i, mv_{vc1}) \quad (9);$$

with the approximation that $$D(MC_{mp2}(\hat{B}_i, MV_{mp2})) = MC'_{mp2}(D(\hat{B}_i)),$$
$$D(MV_{mp2}) = MC'_{mp2}(\tilde{b}_i, mv_{mp2})) \quad (10)$$

Equation 9 is simplified to $$e_{i+1} = D(\hat{r}_{i+1}) + MC'_{mp2}(\tilde{b}_i, mv_{mp2}) - MC'_{vc1}(\tilde{b}_i, mv_{vc1}) \quad (11)$$

In view of Equation 11, the following is obtained:

$$\begin{aligned} e_{i+1} &= D(\hat{r}_{i+1}) + MC'_{mp2}(\tilde{b}_i, mv_{mp2}) - MC'_{vc1}(\tilde{b}_i, mv_{vc1}) = \\ &D(\hat{r}_{i+1}) + [MC'_{mp2}(\tilde{b}_i, mv_{mp2}) - MC'_{vc1}(\tilde{b}_i, mv_{vc1})] + \\ &MC'_{vc1}(\tilde{b}_i, mv_{vc1}) - MC'_{vc1}(\tilde{b}_i, mv_{vc1}) = D(\hat{r}_{i+1}) + \\ &[MC'_{mp2}(\tilde{b}_i, mv_{mp2}) - MC'_{vc1}(\tilde{b}_i, mv_{vc1})] + MC'_{vc1} \\ &(\tilde{b}_i - \tilde{b}_i, mv_{vc1}) \end{aligned} \quad (12)$$

The two terms in the square brackets in Equation 12 compensate for the motion errors caused by inconsistent MVs (i.e., $mv_{mp2}$ is different from $mv_{vc1}$) or caused by different MC filtering methods between MPEG-2 and WMV. The corresponding modules for this purpose are highlighted and grouped into a light-yellow block in FIG. 10.

Figure 10:
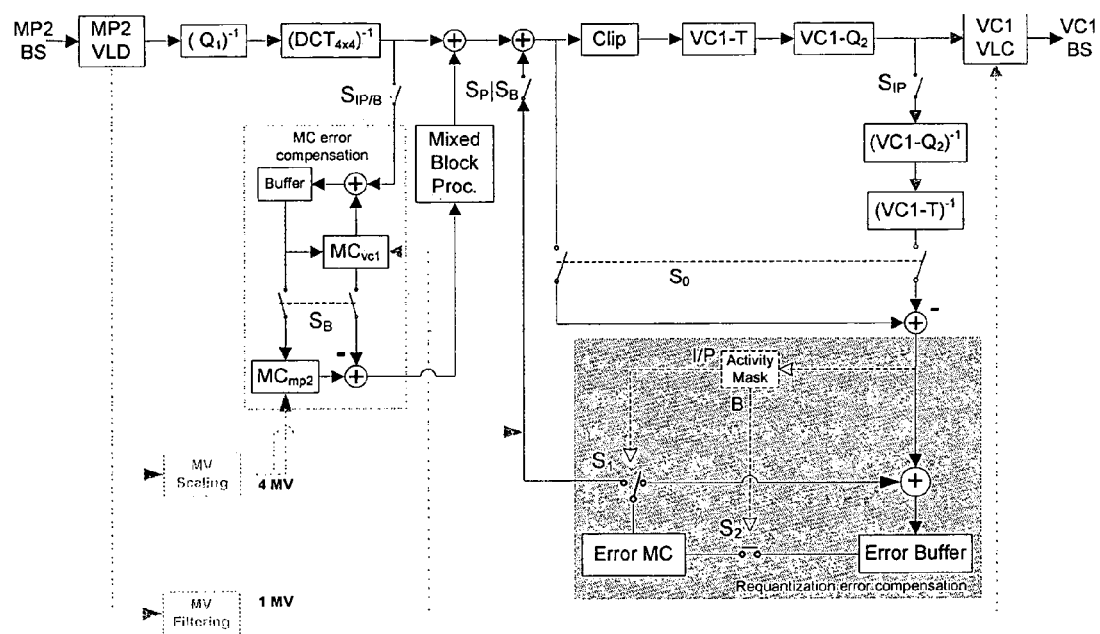
FIG. 10 shows an exemplary simplified 2:1 downscaling transcoder architecture with full drift compensation, according to one embodiment.

FIG. 10 shows an exemplary simplified 2:1 downscaling transcoder architecture with full drift compensation, according to one embodiment. In one implementation, transcoding module 408 of FIG. 4 implements the exemplary architecture of FIG. 10. Referring to Equation 12, please note that $MC'_{mp2}(\tilde{b}_i, mv_{mp2})$ is performed for all the 8×8 blocks that correspond to original Inter MBs, and $mv_{mp2}=MV_{mp2}/2$ with quarter pixel precision. The MV used in the VC-1 encoder is a single MV: $mv_{vc1}=\text{median}(MV_{mp2})/2$. Note that with respect to the motion-error-compensation module, the accuracy of $mv_{vc1}$ can go to quarter-pixel level. The last term in Equation 12 compensates for the requantization error of reference frames. Since B-frames are not reference for other frames, they are more error tolerant. As a result, an application can safely turn off the error compensation to achieve higher speed. Again, such approximation is intended for B-frames only. Please note that MC for motion error compensation operates on reconstructed pixel buffers while the MC for requantization error compensation operates on accumulated residue error buffer.

As to the MC, Intra-to-Inter or Inter-to-Intra conversion can be applied. This is because the MPEG-2 decoder reconstructed the B-frame and the reference frames. In this implementation, this conversion is done in the mixed block-processing module in FIG. 10. Two mode composition methods are possible. And one implementation, the dominant mode is selected as the composed mode. For example, if the modes of the four MBs at the original resolution are two bi-directional prediction mode, one backward prediction mode and one forward prediction mode, then bi-directional prediction mode is selected as the mode for the MB at the reduced resolution. In another implementation, the mode that will lead to the largest error is selected. In view of this example, suppose using the backward mode will cause largest error. In this scenario, the backward mode is chosen such that the error can be compensated. Results show that the latter technique offers slightly better quality as compared to the former mode selection technique.

An exemplary architecture according to Equation 12 is shown in FIG. 10. There are four frame-level switches specifically for this architecture, as shown in TABLE 3.

TABLE 3

Exemplary Frame-Level Switches

| | | |
|---|---|---|
| $S_{IP}$ | Frame level | Switch to be closed for I- and P-frames only |
| $S_P$ | Frame level | Switch to be closed for P-frames only |
| $S_B$ | Frame level | Switch to be closed for B-frames only (=!$S_{IP}$) |
| $S_{IP/B}$ | Frame level | Switch to be closed for I- and P-frames only if there are B-frames |

The four frame-level switches ensure different coding paths for different frame types. Specifically, the architecture does not perform: residue-error accumulation for B-frames ($S_{IP}$), does not perform MV error compensation for I- and P-frames ($S_B$), and does not reconstruct reference frames if there is no B-frames to be generated ($S_{IP/B}$). Please note the frame-level switch $S_B$ can be turned into block-level switch since the MV error needs to be compensated only when the corresponding four original MVs are significantly inconsistent.

More particularly, switch $S_{IP}$ is closed only for I-frames or P-frames, Switch $S_P$ is closed only for P-frames, and switch $S_B$ is closed only for B-frames. The resulting architecture is not as complex as the reference cascaded pixel-domain transcoder of FIG. 3. One reason for this is that the explicit pixel-domain downscaling process is avoided. Instead, pixel-domain downscaling is implicitly achieved in the DCT domain by simply discarding the high DCT coefficients. This architecture has excellent complexity scalability achieved by utilizing various switches, as described above with respect to TABLE 2.

For applications that demand ultra-fast transcoding speed, the architecture of FIG. 10 can be configured into an open-loop one by turn off all the switches. This open-loop architecture can be further optimized by merging the dequantization process of MPEG-2 and the requantization process of WMV. The inverse zig-zag scan module (inside VLD) of MPEG-2 can also be combined with the one in WMV encoder.

Chrominance Components

With respect to chrominance components in MPEG-2 and in WMV, the MV and the coding mode of chrominance components (UV) are derived from those of luminance component (Y). If all the four MBs at the original resolution that correspond to the MB at the reduced resolution have consistent coding mode (i.e., all Inter-coded or all Intra-coded), there is no problem. However, if it is not case, problems result due to different derivation rules of MPEG-2 and WMV. In MPEG-2, the UV blocks are Inter coded when the MB is coded with Inter mode. However, in WMV, the UV blocks are Inter coded only when the MB is coded with Inter mode and there are less than three Intra-coded 8×8 Y blocks. This issue exists for both P-frames and B-frames. Transcoding module 408 of FIG. 4 addresses these problems as follows:

Inter-to-Intra conversion: When the Inter-coded MB has three Intra-coded 8×8 Y blocks (it is impossible for an Inter-coded MB to have all four 8×8 Y blocks Intra coded), the UV blocks are Intra coded. In this case, one MB at the original resolution is Inter-coded along with corresponding UV blocks. These UV blocks will be converted from Inter mode to Intra mode. Since the Human Visual System (HVS) is less sensitive to the chrominance signals, transcoding module 408 utilizes a spatial concealment technique to convert the 8×8 UV blocks from Inter to Intra mode. In one implementation, the DC distance is utilized as an indicator to determine the concealment direction. Concealment is achieved via a simple copy or any other interpolation method.

Intra-to-Inter conversion: When an Inter-coded MB has one or two Intra-coded 8×8 Y blocks, transcoding module 408 inter-codes the UV blocks. In this scenario, there are one or two Intra-coded MBs among the four corresponding MBs at the original resolution. These UV blocks are converted from Intra mode to Inter mode. In this implementation, transcoding module 408 utilizes a temporal concealment technique called the zero-out method to handle these blocks, and thereby, avoid the decoding loop.

Using error concealment operations to handle mode conversion for chrominance component, error introduced into a current frame is negligible and can be ignored, although it may cause color drifting in subsequent frames. Drifting for the chrominance component is typically caused by incorrect motion. To address this and improve quality, in one implementation, transcoding module 408 uses reconstruction based compensation for the chrominance component (i.e., always applying the light-yellow module for the chrominance component).

Rate Control

Figure 11:
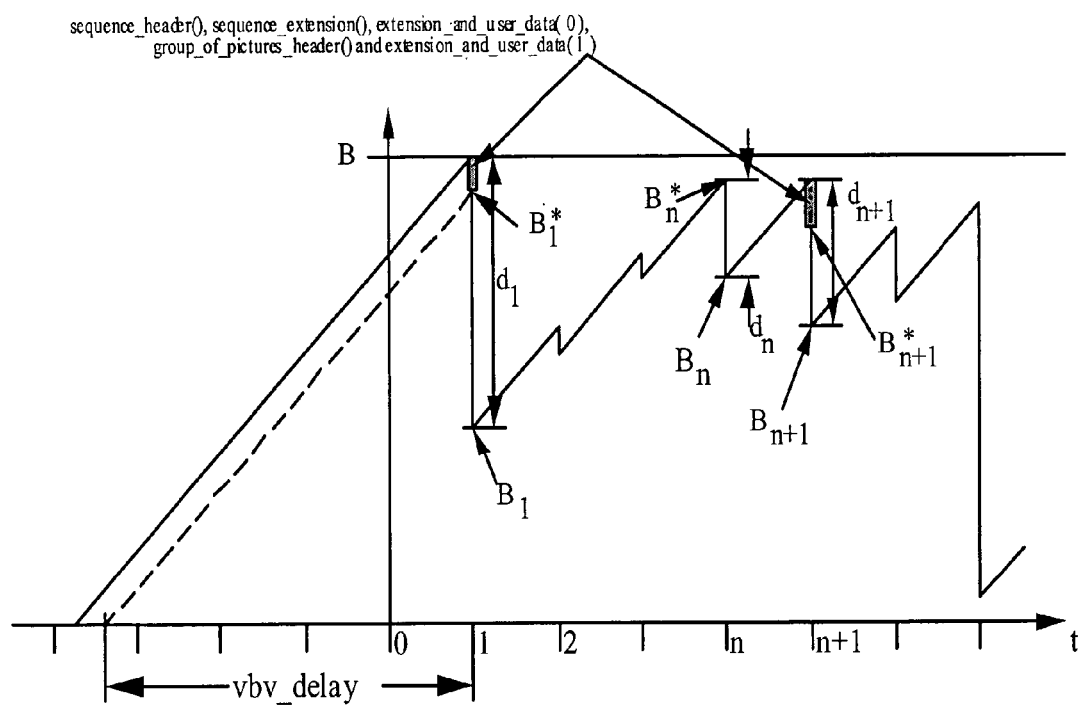
FIG. 11 shows an exemplary standard virtual buffer verifier buffer (VBV) model for a decoder.

FIG. 11 shows an exemplary virtual buffer verifier buffer (VBV) model for a decoder. A decoder based on the VBV model of FIG. 11 will typically verify an existing MPEG-2 bitstream. In this implementation, if the video rate is decreased proportional to the input rate, then the transcoded WMV bitstream will automatically satisfy the VBV requirements. In view of this, the efficient digital video transcoding architecture of this specification makes the coded frame size proportional to the input frame size for all the frames. These novel architectures continually compensate for accumulated differences between the target frame size and the actual resultant frame size, and obtain, via training, a linear quantization step (QP) mapping rule for different bit rate ranges.

For high bit rate, there is an approximate formula between coding bits (B) and quantization step (QP) which is also used in MPEG-2 TM-5 rate control method.

$$B = S \cdot \frac{X}{QP} \quad (13)$$

where S is the complexity of frame, X is model parameters. Assuming the complexity of a frame remains the same for different codecs:

$$QP_{vc1} = \left(\frac{X_{vc1}}{X_{mp2}}\right) \cdot \left(\frac{B_{mp2}}{B_{vc1}}\right) \cdot QP_{mp2} = k \cdot \left(\frac{B_{mp2}}{B_{vc1}}\right) \cdot QP_{mp2}$$

where $QP_{vc1}$ is the QP value used in WMV re-quantization, $QP_{mp2}$ is QP value of MPEG-2 quantization, and k is the model parameter related to the target bit rate. In one implementation, the following linear model is utilized:

$$QP_{vc1}/QP_{mp2} = k \cdot (B_{mp2}/B_{vc1}) + t \quad (14)$$

The values of parameter k and t for low, medium and high bit rate cases are listed in TABLE 4 using the linear regression method.

TABLE 4

EXEMPLARY PARAMETER VALUES FOR
LINEAR REGRESSION METHODOLOGY

| | Frame Type | | | | | |
|---|---|---|---|---|---|---|
| | I frame | | P frame | | B frame | |
| Parameters | k | t | k | t | k | t |
| Low (<1 Mbps) | 0.612861 | −0.194954 | 0.016081 | 3.128561 | 0.076037 | 2.264825 |
| Med (<3 Mbps) | 0.314311 | 0.070494 | 0.041140 | 1.400647 | 0.207292 | 0.545977 |
| High | 0.682409 | −0.248120 | 0.057869 | 1.115930 | 0.199024 | 0.441518 |

An exemplary detailed rate control algorithm based on Equation 14 is shown in TABLE 5, where the meanings of various symbols in the algorithm presented in TABLE 5 are defined in following TABLE 6.

TABLE 5

EXEMPLARY RATE CONTROL ALGORITHM

Initialize SumD = 0;
While (MPEG-2 stream is not end)
{
    Step 1:   Decode one MPEG2 frame and get $B_{mp2}$ and $QP_{mp2}$;

$$\text{Step2: } B_{pred\_vc1} = B_{mp2} \cdot \frac{R_{vc1}}{R_{mp2}}$$

$$B_{vc1} = B_{pred\_vc1} + SumD$$

If ($B_{vc1}$ < 0) then $B_{vc1}$ = 1;

$$QP_{vc1} = \left(k \cdot \frac{B_{mp2}}{B_{vc1}} + t\right) \cdot QP_{mp2};$$

Round and Clip $QP_{vc1}$ to [1, 31];
    Step3:   Encode this frame into WMV frame using $QP_{vc1}$;
    Step4:  Obtain the actual coded WMV frame size $B_{actual\_vc1}$;

Update SumD: SumD = SumD + $B_{pred\_vc1}$ − $B_{actual\_vc1}$;
}

TABLE 6

DEFINITIONS OF SYMBOLS USED
IN THE ALGORITHM OF TABLE 5

| | |
|---|---|
| $B_{mp2}$ | MPEG-2 frame size; |
| $R_{mp2}$ | MPEG-2 stream bit rate; |
| $R_{vc1}$ | Target WMV stream bit rate; |
| $B_{pred\_vc1}$ | WMV frame size predicted by the ratio of bit rate; |
| $B_{vc1}$ | Expected WMV frame size to encode (new bit rate); |
| $B_{actual\_vc1}$ | Actual encoded WMV frame size; |
| SumD | Accumulated differences between the predicted and actual WMV frame size from beginning. |

Arbitrarily Resolution Change

Conversion of contents from HD resolution to SD resolution, for example to support legacy SD receivers/players, is useful. Typical resolutions of HD format are 1920×1080i and 1280×720p while those for SD are 720×480i, 720×480p for NTSC. The horizontal and vertical downscaling ratios from 1920×1080i to 720×480i are 8/3 and 9/4, respectively. To keep the aspect ratio, the final downscaling ratio is chosen to be 8/3 and the resulting picture size is 720×404. Similarly, for 1280×720p to 720×480p, the downscaling ratio is chosen to be 16/9 and the resulting picture size is 720×404. Black banners are inserted to make a full 720×480 picture by the decoder/player (instead of being padded into the bitstream).

According to digital signal processing theory, a substantially optimal downscaling methodology for a downscaling ratio m/n, would be to first up sample the signal by n-fold (i.e., insert n−1 zeros between every original samples), apply a low-pass filter (e.g., a sinc function with many taps), and then decimate the resulting signal by m-fold. Performing such operations, any spectrum aliasing introduced by the downscaling would be maximally suppressed. However, this process would also be very computationally expensive, and difficult to implement with in real-time because the input signal is high definition. To reduce this computational complexity, a novel two-stage downscaling strategy is implemented.

Figure 12:
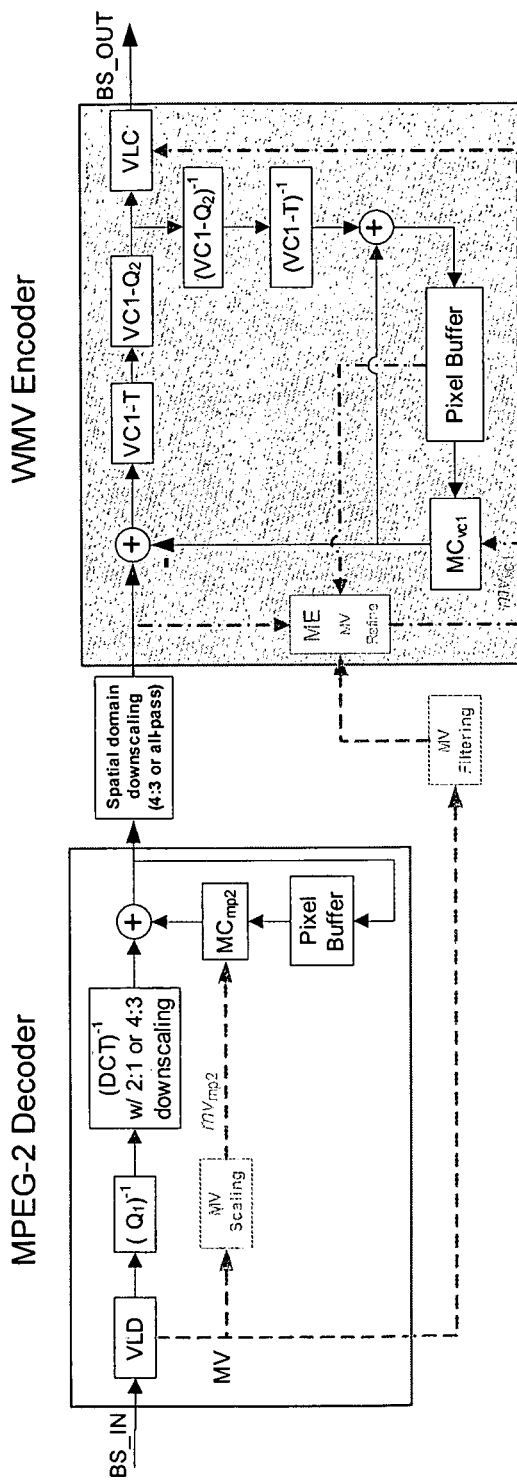
FIG. 12 shows a transcoder with arbitrarily spatial resolution downscaling, according to one embodiment.

FIG. 12 shows a transcoder with arbitrarily spatial resolution downscaling, according to one embodiment. In one implementation, transcoding module 408 of FIG. 4 implements architecture of FIG. 12. In one implementation, the arbitrary downscaling transcoder is a non-integrated transcoder, such as in FIG. 12. In another implementation, the following arbitrary downscaling transcoding operations, which are described below with respect to FIG. 12, are implemented in an integrated transcoder such as that shown in FIGS. 5, 6, 8, and/or 10.

Referring to FIG. 12, system 1200 implements two-stage downscaling operations to achieve any arbitrary downscaling target. Results of the first stage downscaling are embedded into the decoding loop. This reduces the complexity of the decoding operations. For example, to achieve an 8/3 downscale ratio, downscaling operations are first implemented to downscale by 2/1. The results of this first stage downscaling are input into the decoding loop, wherein second stage downscaling is performed in the spatial domain. In this example, second stage downscaling operations downscale by 4/3 to achieve an 8/3 downscale ratio. In another example, a downscale ratio of 16/9 is achieved by system 1200 by applying 4/3 downscaling twice (in two stages). This two-stage downscaling methodology utilizes the previously discussed DCT-domain downscaling strategy, and then fully embeds the first stage downscaling results into the decoding loop. Since resolution is significantly reduced after the first stage downscaling, we can continue to apply the optimal downscaling method on the pixel-domain.

Referring to FIG. 12, please note that multiple MVs $$\left(\text{between } \lfloor \tfrac{m}{n} \rfloor \times \lfloor \tfrac{m}{n} \rfloor \text{ and } \lceil \tfrac{m}{n} \rceil \times \lceil \tfrac{m}{n} \rceil\right)$$

are associated with a new MB (the MV scaling and filtering modules).

Exemplary Procedure

Figure 13:
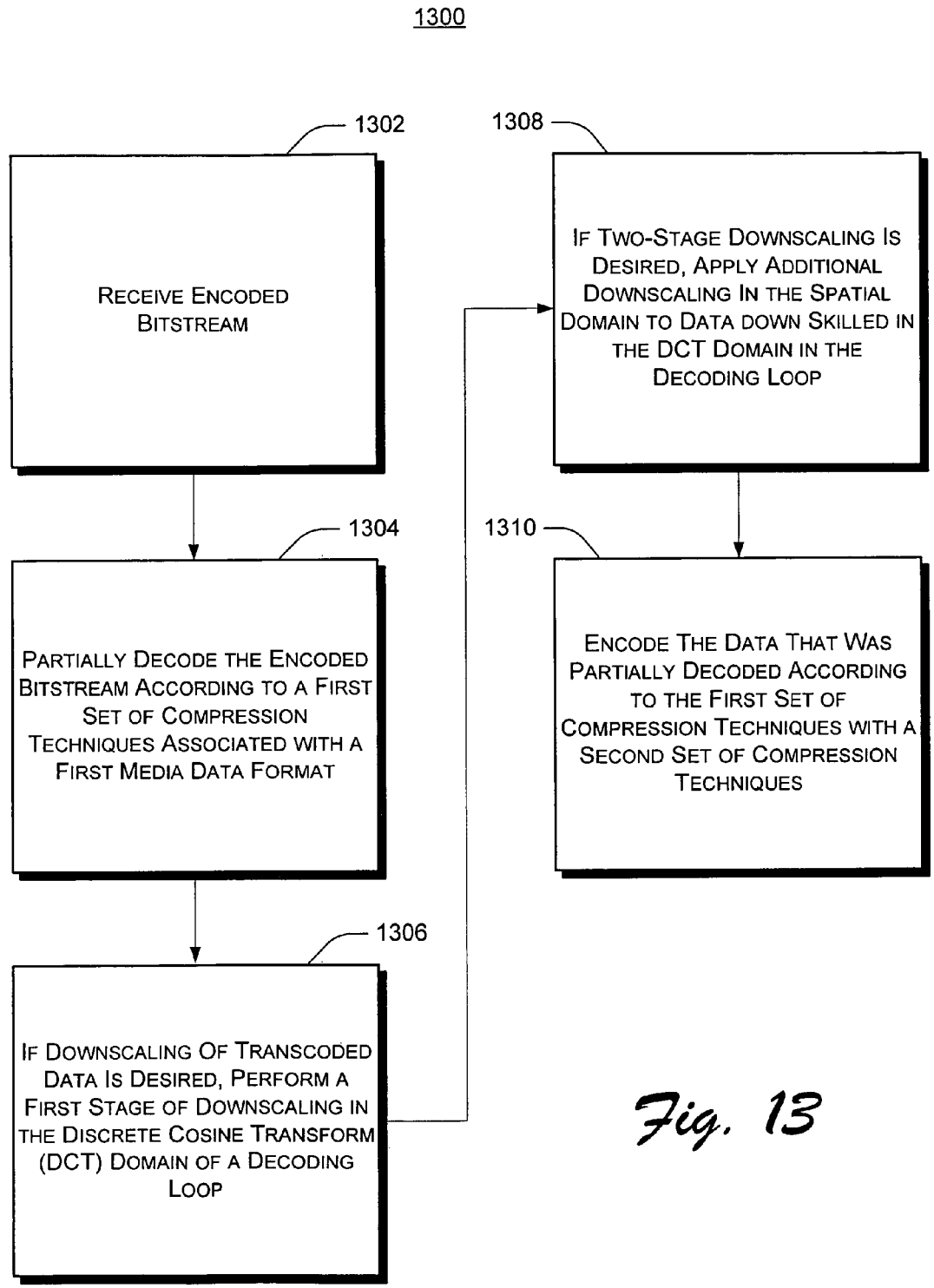
FIG. 13 shows an exemplary procedure for efficient integrated digital video transcoding operations, according to one embodiment.

FIG. 13 illustrates a procedure 1300 for efficient digital video transcoding, according to one embodiment. In one implementation, transcoding module 408 of FIG. 4 implements the operations of procedure 1300. Referring to FIG. 13, at block 1302, the procedure receives an encoded bitstream (e.g., encoded media 412 of FIG. 4). At block 1304, the procedure partially decodes the encoded bitstream according to a first set of compression techniques associated with a first media data format (e.g., MPEG-2, MPEG-4, etc.). The partial decoding operations generate an intermediate data stream. The integrated transcoder does not perform full decoding. For example, in cases where the MC of the "conceptual" MPEG-2 decoder is merged with that of the WMV encoder, it is hard to describe the decoding operations as performing MPEG-2 decoding. At block 1306, if downscaling of the intermediate data stream is desired, the procedure downscales data associated with the encoded bitstream in a first stage of downscaling. The first stage of downscaling is implemented in the DCT domain of a decoding loop. At block 1308, if two-stage downscaling is desired, the procedure further downscales in the spatial domain the data that was downscaled in the DCT domain (see block 1306).

At block 1310, the data decoded according to the first set of compression techniques is encoded with a second set of compression techniques. In one implementation, procedure 1300 is implemented within a non-integrated transcoding architecture, such as that shown and described with respect to FIGS. 12 and 14. In this implementation, the second set of compression techniques is the same as the first set of compression techniques. In another implementation, procedure 1300 is implemented within an integrated transcoding architecture, such as that shown and described with respect to FIGS. 5-11, and 14. In this other implementation, the second set of compression techniques is not the same as the first set of compression techniques. For example, in one implementation, the first set of compression techniques is associated with MPEG-2, and the second set of compression techniques is associated with WMV.

An Exemplary Operating Environment

Figure 14:
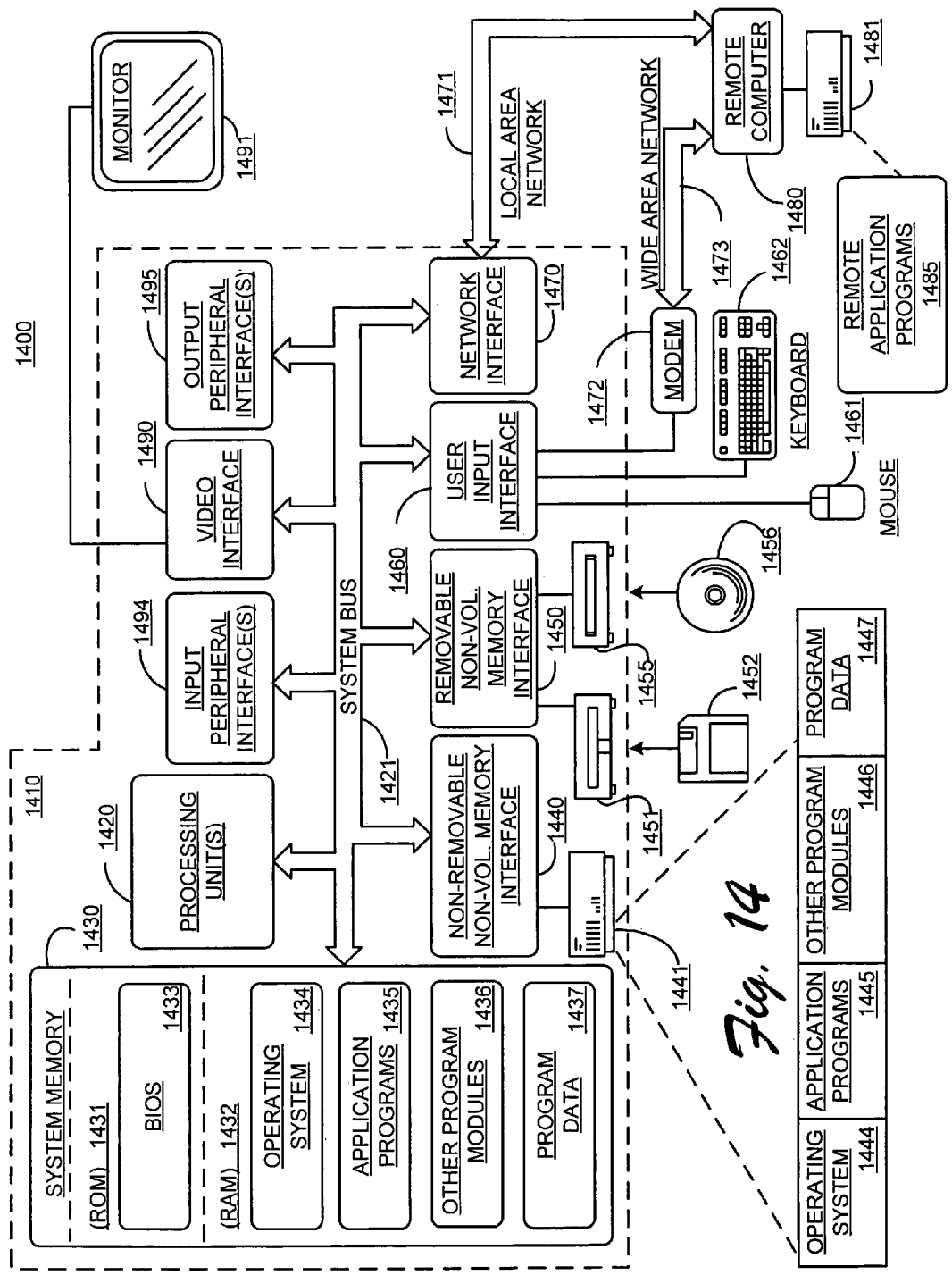
FIG. 14 shows an exemplary environment wherein efficient integrated digital video transcoding can be partially or fully implemented, according to one embodiment.

FIG. 14 illustrates an example of a suitable computing environment in which efficient digital video transcoding may be fully or partially implemented. Exemplary computing environment 1400 is only one example of a suitable computing environment for the exemplary system 400 of FIG. 4, and is not intended to suggest any limitation as to the scope of use or functionality of systems and methods the described herein. Neither should computing environment 1400 be interpreted as having any dependency or requirement relating to any one or combination of components illustrated in computing environment 1400.

The methods and systems described herein are operational with numerous other general purpose or special purpose computing system, environments or configurations. Examples of well-known computing systems, environments, and/or configurations that may be suitable for use include, but are not limited to personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a networked computing environment where tasks are performed by remote processing devices that are linked through a communications network.

Figure 1:
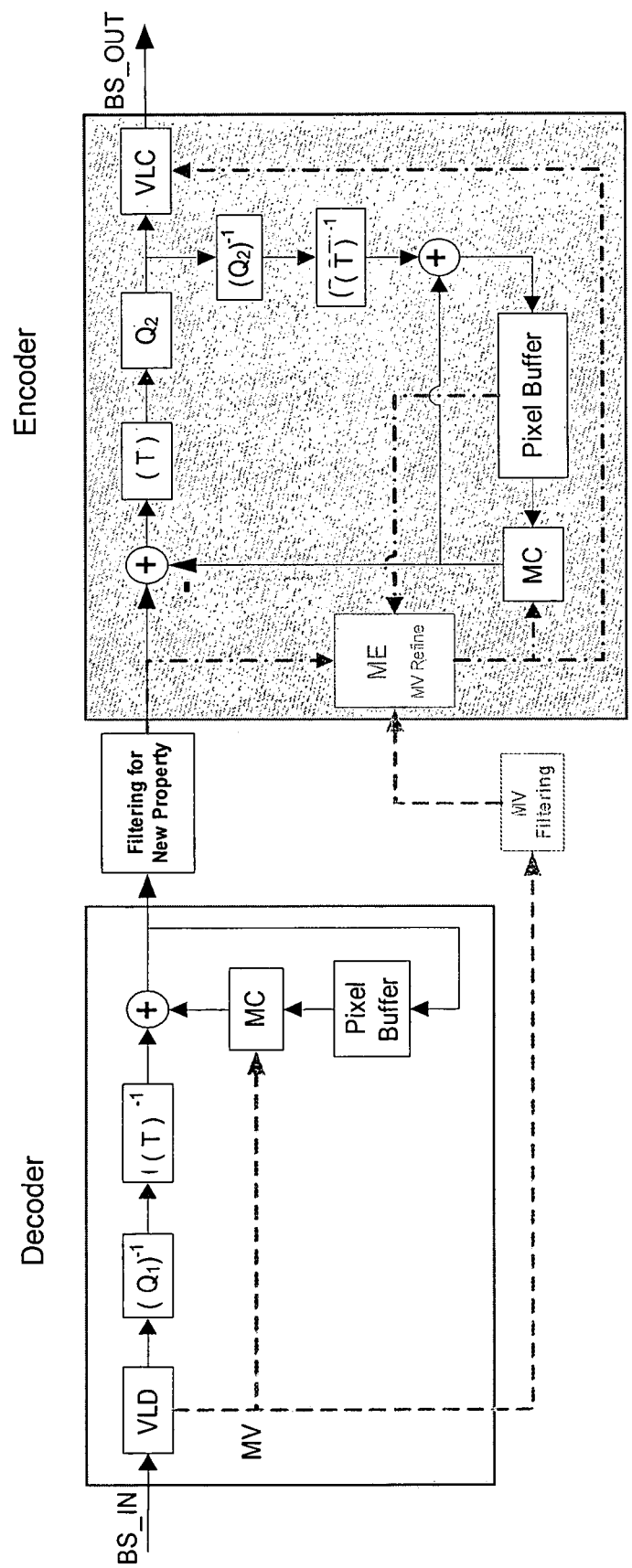
FIG. 1 shows a conventional Cascaded Pixel-Domain Transcoder (CPDT) system, which cascades a front-end decoder to decode an input bitstream with an encoder to generate a new bitstream with a different coding parameter set or in new format.
Figure 2:
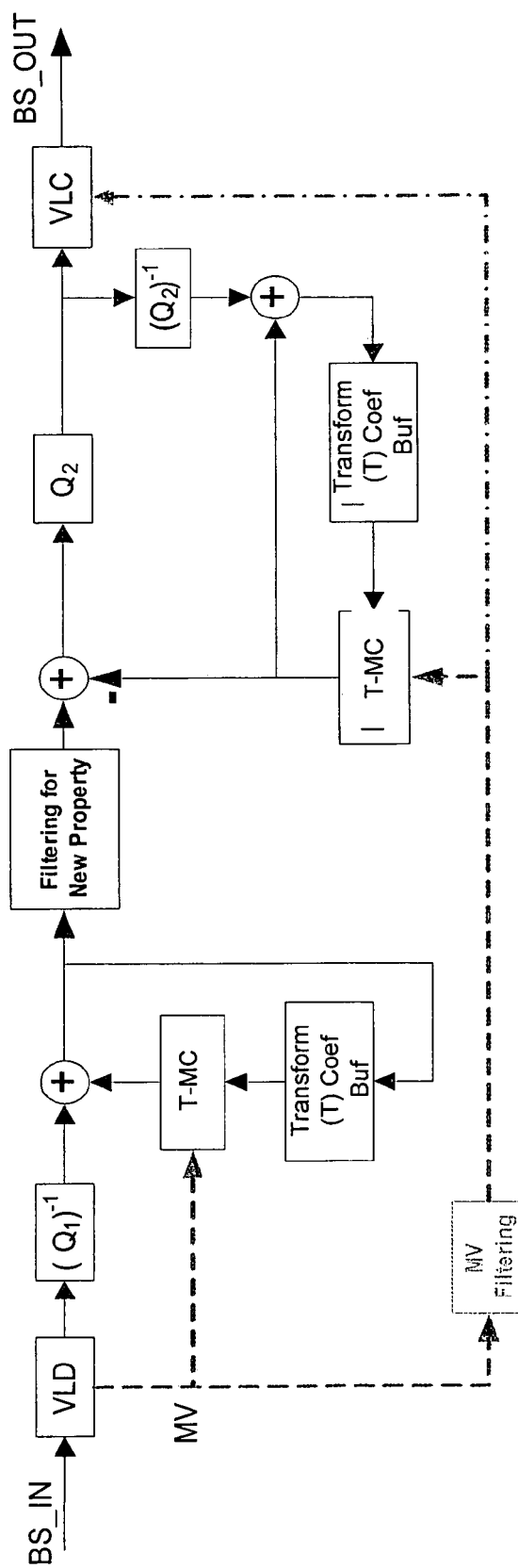
FIG. 2 shows a conventional cascaded DCT-domain transcoder (CDDT) architecture, simplifying the CPDT architecture of FIG. 1.

With reference to FIG. 14, an exemplary system providing efficient digital video transcoding architecture includes a general-purpose computing device in the form of a computer 1410 implementing, for example, initiator operations associated with computing device 102 of FIG. 1. Components of computer 1410 may include, but are not limited to, processing unit(s) 1418, a system memory 1430, and a system bus 1421 that couples various system components including the system memory to the processing unit 1418. The system bus 1421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 1410 typically includes a variety of computer-readable media. Computer-readable media can be any available media that can be accessed by computer 1410, including both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 1430 includes computer storage media in the form of volatile and/or nonvolatile memory such as read only memory (ROM) 1431 and random access memory (RAM) 1432. A basic input/output system 1433 (BIOS), containing the basic routines that help to transfer information between elements within computer 1410, such as during start-up, is typically stored in ROM 1431. RAM 1432 typically contains data and/or program modules that are immediately accessible to and/or presently being operated on by processing unit 1418. By way of example and not limitation, FIG. 14 illustrates operating system 1434, application programs 1435, other program modules 1436, and program data 1437.

The computer 1410 may also include other removable/non-removable, volatile/nonvolatile computer storage media. By way of example only, FIG. 14 illustrates a hard disk drive 1441 that reads from or writes to non-removable, nonvolatile magnetic media, a magnetic disk drive 1451 that reads from or writes to a removable, nonvolatile magnetic disk 1452, and an optical disk drive 1455 that reads from or writes to a removable, nonvolatile optical disk 1456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1441 is typically connected to the system bus 1421 through a non-removable memory interface such as interface 1440, and magnetic disk drive 1451 and optical disk drive 1455 are typically connected to the system bus 1421 by a removable memory interface, such as interface 1450.

The drives and their associated computer storage media discussed above and illustrated in FIG. 14, provide storage of computer-readable instructions, data structures, program modules and other data for the computer 1410. In FIG. 14, for example, hard disk drive 1441 is illustrated as storing operating system 1444, application programs 1445, other program modules 1446, and program data 1447. Note that these components can either be the same as or different from operating system 1434, application programs 1435, other program modules 1436, and program data 1437. Operating system 1444, application programs 1445, other program modules 1446, and program data 1447 are given different numbers here to illustrate that they are at least different copies.

A user may enter commands and information into the computer 1410 through input devices such as a keyboard 1462 and pointing device 1461, commonly referred to as a mouse, trackball or touch pad. Other input devices (not shown) may include a microphone, joystick, graphics pen and pad, satellite dish, scanner, etc. These and other input devices are often connected to the processing unit 1418 through a user input interface 1460 that is coupled to the system bus 1421, but may be connected by other interface and bus structures, such as a parallel port, game port or a universal serial bus (USB). In this implementation, a monitor 1491 or other type of user interface device is also connected to the system bus 1421 via an interface, for example, such as a video interface 1490.

The computer 1410 operates in a networked environment using logical connections to one or more remote computers, such as a remote computer 1480. In one implementation, remote computer 1480 represents computing device 106 of a responder, as shown in FIG. 1. The remote computer 1480 may be a personal computer, a server, a router, a network PC, a peer device or other common network node, and as a function of its particular implementation, may include many or all of the elements described above relative to the computer 1410, although only a memory storage device 1481 has been illustrated in FIG. 14. The logical connections depicted in FIG. 14 include a local area network (LAN) 1481 and a wide area network (WAN) 1473, but may also include other networks. Such networking environments are commonplace in offices, enterprise-wide computer networks, intranets and the Internet.

When used in a LAN networking environment, the computer 1410 is connected to the LAN 1471 through a network interface or adapter 1470. When used in a WAN networking environment, the computer 1410 typically includes a modem 1472 or other means for establishing communications over the WAN 1473, such as the Internet. The modem 1472, which may be internal or external, may be connected to the system bus 1421 via the user input interface 1460, or other appropriate mechanism. In a networked environment, program modules depicted relative to the computer 1410, or portions thereof, may be stored in the remote memory storage device. By way of example and not limitation, FIG. 14 illustrates remote application programs 1485 as residing on memory device 1481. The network connections shown are exemplary and other means of establishing a communications link between the computers may be used.

Conclusion

Although the above sections describe efficient digital video transcoding architectures in language specific to structural features and/or methodological operations or actions, the implementations defined in the appended claims are not necessarily limited to the specific features or actions described. Rather, the specific features and operations of the described efficient integrated digital video transcoding architecture are disclosed as exemplary forms of implementing the claimed subject matter.

For example, in one implementation, the described fast and high quality transcoding systems and methodologies, including transcoding, arbitrary sized downscaling, and rate reduction are used for MPEG-2 to MPEG-4 transcoding and MPEG-4 to WMV transcoding. For instance, the simplified closed-loop DCT-domain transcoder in FIG. 6 can be used to transcode MPEG-4 to WMV. One difference between MPEG-2 (IS-13818 Part. 2) is that MPEG-2 only utilizes half pixel element (pel) MV precison and bilinear interpolation in MC; there is such a same mode (half pel bilinear) in WMV. However, MPEG-4 supports both half pel and quarter pel MV precision, as well as interpolation for quarter pel positions (different from that in WMV). To address this difference, when ½ pel MV is used by MPEG-4 video, then the transcoding process is the same as MPEG-2 to WMV transcoding, as described above. Additionally, when ¼ pel MV is contained in MPEG-4 video, then error is introduced due to different interpolation methods in MC as described above with respect to FIG. 6. Additionally, the simplified 2:1 downscaling transcoder with full drift compensation described above with respect to FIG. 10 is applicable to MPEG-4 to WMV 2:1 downsized transcoding independent of change. Moreover, high quality transcoding, including the above described rate reduction and arbitrarily downscaling transcoding operations of FIG. 12 are effective for MPEG-4 to WMV transcoding.

The invention claimed is:

1. A computer-implemented method comprising:
receiving, by an integrated transcoder, an encoded bitstream; and
transcoding, by the integrated transcoder, the encoded bitstream, the transcoding comprising:
partially decoding, by the integrated transcoder, the encoded bitstream to generate an intermediate data stream, the encoded bitstream being encoded with a first set of compression techniques associated with a first media format; and
encoding, by the integrated transcoder, the intermediate data stream using a second set of compression techniques to generate a transcoded bitstream, the second set of compression techniques corresponding to a second media format, wherein
the integrated transcoder integrates the partial decoding with the encoding by combining a first transform associated with the partial decoding and a second transform associated with the encoding as a single scaling matrix and replacing the single scaling matrix by a scalar multiplication.

2. The computer-implemented method of claim 1, wherein the first media format is MPEG-2 and wherein the second media format is WMV.

3. The computer-implemented method of claim 1, wherein the first media format is MPEG-2 and wherein the second media format is MPEG-4.

4. The computer-implemented method of claim 1, wherein the integrated transcoder is a closed loop transcoder that prevents error propagation via error compensation.

5. The computer-implemented method of claim 1, wherein the integrated transcoder is an open loop transcoder that includes error propagation.

6. The computer-implemented method of claim 1, wherein transcoding further comprises dynamically turning on or off one or more operations associated with residue-error compensation to respectively increase quality or speed of the transcoding.

7. The computer-implemented method of claim 1, wherein transcoding implements residue-error compensation, and wherein transcoding further comprises:
   responsive to determining that reference frames are processed, dynamically adjusting one or more operations to adjust a quality and speed at which the reference frames are transcoded,
   wherein the one or more operations comprise block requantization error accumulation, motion compensation of accumulated error, and detection to determine whether a particular block error is to be encoded.

8. The computer-implemented method of 1, wherein transcoding implements residue-error compensation, and wherein transcoding further comprises one or more of a plurality of operations, the plurality of operations comprising:
   responsive to a threshold based drifting control mechanism, dynamically turning on or off block requantization error accumulation into a residue-error buffer;
   responsive to an evaluation of block activity, dynamically turning on or off motion compensation of accumulated error in the residue error buffer; and
   responsive to a determination based on a sum of the motion compensation accumulated residue error and a reconstructed residue from the partially decoding, dynamically turning on or off encoding of a block error.

9. The computer-implemented method of claim 1, wherein partially decoding further comprises implementing rate control with a coded frame size proportional to an input frame size for all frames, wherein the rate control provides continued compensation for accumulated differences between a target frame size and an actual resultant frame size.

10. The computer-implemented method of claim 1, further comprising discarding Discrete Cosine Transform (DCT) coefficients above a predetermined threshold to downscale the intermediate data stream in a DCT without performing explicit pixel-domain downscaling.

11. The computer-implemented method of claim 1, wherein transcoding further comprises implementing two-stage downscaling operations to obtain an arbitrary downscaling target ratio.

12. The computer-implemented method of claim 11, wherein the two-stage downscaling operations further comprise:
   implementing first stage downscaling operations in a DCT domain decoding loop; and
   performing second stage downscaling operations outside of the DCT domain decoding loop in a pixel domain.

13. The computer-implemented method of claim 11, wherein the two-stage downscaling operations further comprise:
   performing first stage downscaling operations to obtain a first result that is intermediate to the arbitrary downscaling target ratio;
   inputting the first result into a decoding loop; and
   implementing second stage downscaling operations in a spatial domain to obtain the arbitrary downscaling target ratio.

14. A computer-implemented method comprising:
   transcoding, by an integrated transcoder, an encoded bitstream, the transcoding comprising:
   partially decoding, by the integrated transcoder, the encoded bitstream to generate an intermediate data stream, the encoded bitstream being encoded with a first set of compression techniques associated with a first media format; and
   encoding, by the integrated transcoder, the intermediate data stream using a second set of compression techniques to generate a transcoded bitstream, the second set of compression techniques corresponding to a second media format, the second media format being different from the first media format,
   wherein the integrated transcoder merges a first transform and a second transform respectively associated with the first media format and the second media format into a scaling matrix and replaces the scaling matrix by a scalar multiplication.

15. The computer-implemented method of claim 14, wherein the first media format is MPEG-2 and wherein the second media format is WMV.

16. The computer-implemented method of claim 14, wherein transcoding further comprises:
   dynamically turning on or off one or more operations associated with residue-error compensation to respectively increase quality or speed of the transcoding; and
   wherein the one or more operations are toggled on or off based on one or more of the following:
   a threshold based drifting control mechanism;
   evaluation of block activity levels; and
   a sum of motion compensation accumulated residue error and reconstructed residue from decoding operations.

17. The computer-implemented method of claim 14, further comprising:
   downscaling data associated with the encoded bitstream in a DCT domain of a decoding loop; or
   downscaling the data in a two-stage downscaling process, the two-stage downscaling process comprising:
   downscaling, in a first stage, the data in the DCT domain; and
   reducing resolution of downscaled results of the first stage in the spatial domain.

18. A computer-implemented method comprising:
   partially decoding, by an integrated transcoder, an encoded bitstream to generate an intermediate data stream, the encoded bitstream being encoded with a first set of compression techniques associated with a first media format, the partially decoding comprising:
   downscaling bitstream data in a DCT domain of a decoding loop;
   determining whether to further reduce the bitstream data outside of the decoding loop in a spatial domain, the determining comprising:
   reducing resolution of DCT domain downscaled bitstream data in the spatial domain; or
   allowing the DCT domain downscaled bitstream data to pass without further resolution reduction;
   encoding, by the integrated transcoder, the intermediate data stream using a second set of compression techniques to generate a transcoded bitstream, the second set of compression techniques corresponding to a second media format, wherein
   the integrated transcoder integrates the partial decoding with the encoding by combining a first transform associated with the partial decoding and a second transform associated with the encoding as a single scaling matrix and replacing the single scaling matrix by a scalar multiplication.

19. The computer-implemented method of claim 1, further comprising downscaling a block of the transcoded bitstream by reconstructing a full resolution picture from the transcoded bitstream independent of mixed block processing and a decoding loop.

\* \* \* \* \*